US008352578B2

United States Patent
Tsai et al.

(10) Patent No.: US 8,352,578 B2
(45) Date of Patent: Jan. 8, 2013

(54) DATA-TRANSMITTING METHOD FOR WIRELESS SENSOR NETWORK

(75) Inventors: Cheng-Fa Tsai, Pingtung (TW); Shih-Yuan Chao, Changhua (TW)

(73) Assignee: National Pingtung University of Science & Technology, Pingtung County (TW)

( * ) Notice: Subject to any disclaimer, the term of this patent is extended or adjusted under 35 U.S.C. 154(b) by 1190 days.

(21) Appl. No.: 12/186,583

(22) Filed: Aug. 6, 2008

(65) Prior Publication Data

US 2009/0046630 A1    Feb. 19, 2009

(30) Foreign Application Priority Data

Aug. 14, 2007 (TW) .............................. 96129989 A

(51) Int. Cl.
| | |
|---|---|
| G06F 15/177 | (2006.01) |
| G06F 15/16 | (2006.01) |
| G06F 15/173 | (2006.01) |
| H04L 12/26 | (2006.01) |
| H04L 12/28 | (2006.01) |
| H04H 20/71 | (2008.01) |
| H04W 4/00 | (2009.01) |
| H04W 40/00 | (2009.01) |

(52) U.S. Cl. ........ 709/220; 709/224; 709/252; 709/206; 370/338; 370/252; 370/254; 370/328; 370/312; 455/445

(58) Field of Classification Search ................... 709/206
See application file for complete search history.

(56) References Cited

U.S. PATENT DOCUMENTS

| | | | |
|---|---|---|---|
| 6,944,607 B1* | 9/2005 | Zhang et al. .................. 707/737 |
| 7,266,085 B2 | 9/2007 | Stine | |
| 7,333,827 B2 | 2/2008 | Biddiscombe et al. | |
| 2003/0005258 A1* | 1/2003 | Modha et al. ..................... 712/1 |
| 2003/0033394 A1* | 2/2003 | Stine ............................. 709/222 |
| 2004/0174825 A1* | 9/2004 | Li et al. ......................... 370/254 |
| 2005/0276251 A1* | 12/2005 | Biddiscombe et al. ....... 370/338 |
| 2006/0013154 A1* | 1/2006 | Choi et al. ..................... 370/312 |
| 2006/0178150 A1* | 8/2006 | Kim ............................... 455/445 |
| 2006/0253570 A1* | 11/2006 | Biswas et al. ................. 709/224 |
| 2007/0005292 A1* | 1/2007 | Jin ................................. 702/150 |
| 2007/0019569 A1* | 1/2007 | Park et al. ..................... 370/254 |
| 2007/0171050 A1* | 7/2007 | Westhoff et al. ......... 340/539.22 |
| 2008/0104218 A1* | 5/2008 | Liang et al. ................... 709/223 |
| 2009/0168670 A1* | 7/2009 | Yang ............................. 370/254 |

* cited by examiner

*Primary Examiner* — Kevin Bates
*Assistant Examiner* — Mohammed Ahmed
(74) *Attorney, Agent, or Firm* — Alan Kamrath; Kamrath IP Lawfirm, PA

(57) ABSTRACT

A data-transmitting method for wireless sensor network includes: constructing a wireless sensor network having a plurality of nodes for information sensing and a sink for quest raising and data collecting; clustering the nodes to form a plurality of groups, with one of the nodes in each group being identified as a kernel; identifying one of all the nodes as a summit dissemination node and the kernels in all the groups as first level dissemination nodes; and transmitting data between the quest-raising sink and one of the first level dissemination nodes or summit dissemination node to collect information sensed by a source that is one of the nodes.

7 Claims, 10 Drawing Sheets

DATA-TRANSMITTING METHOD FOR WIRELESS SENSOR NETWORK

BACKGROUND OF THE INVENTION

1. Field of the Invention

The present invention relates to a data-transmitting method for wireless sensor network and, particularly, to a constructing method creating a data transmission model by a hierarchical data clustering technique to lower power consumption of a wireless sensor network.

2. Description of the Related Art

Nowadays, wireless sensor networks applied in environmental observation are implemented by disposing a plurality of sensors with low cost and small volume in a predetermined area and transmitting data between said sensors. For example, when a wireless sensor network is constructed in a hothouse, factors that affect the growth of plants such as temperature, humidity, illumination and sounds may be effectively detected. How to lower power consumption and cost of construction and to raise stability of data transmission are the critical points for the implement of the wireless sensor network. However, once the wireless sensor network is applied, every change in position of a mobile sink collecting data through sensors of a wireless sensor network causes the routes for data transmission to be rebuilt, which may easily induce a global flooding. Thus, an extra power consumption may occur.

In order to solve the above-mentioned problem about power consumption, several conventional data-transmitting methods realized by wireless sensor networks with grid-based data transmission models are provided. For example, Haiyun Luo et al. proposed a method named "two-tier data dissemination (TTDD)" for the same reason. Referring to FIG. 1, for carrying out the TTDD method, a wireless sensor network 1 having a plurality of nodes 11 and at least one sink 12 is pre-built in an area, with the area being divided into a plurality of virtual cubes 13 that jointly construct a matrix. Furthermore, several nodes 11 adjacent to the intersections of boundaries of the virtual cubes 13 are identified as dissemination nodes 111. Besides, it is supposed that each node used in the TTDD method is aware of other nodes' positions.

For different levels of data transmission, the TTDD method provides a two-staged transmitting method: a "lower-tier query grid forwarding" stage and a "higher-tier query grid forwarding" stage. In detail, within a virtual cube 13, the data transmission is done through the lower-tier query grid forwarding stage; and if the data transmission has to be done beyond a single virtual cube 13, the higher-tier query grid forwarding stage is then executed.

In the lower-tier query grid forwarding stage, when a sink 12 raises a quest for data collection, a closest node 11 to the sink 12 will be identified as a primary agent (PA), and then one of the closest dissemination nodes 111 to the PA will handle the further data transmission. Now referring to FIG. 2, if the position of the sink 12 is changed and is out of a transmission range of the PA, another node 11 which is presently the closest node 11 to the sink 12 will then be identified as an immediately agent (IA). Then, the IA will continuously transmit quests for data collection from the sink 12 to the PA without breaking off the data transmission.

Referring to FIG. 1 again, in high-tier query grid forwarding, the data transmission over several virtual cubes 13 is carried out by transmitting data along a link between two of the dissemination nodes 111. Therefore, when a flooding exists about the sink 12, instead of diffusing all over the wireless sensor network 1, the flooding will be restricted merely within the virtual cube 13 where the sink 12 is.

However, although the conventional TTDD method can restrict the flooding within a virtual cube 13 containing the sink 12 to improve power saving, data transmission within the virtual cube 13 still raises a large amount of wasted power. Thus, the TTDD method may still cause unbalanced power consumption over the wireless sensor network 1. Hence, there is a need of improving the conventional clustering techniques.

SUMMARY OF THE INVENTION

The primary objective of this invention is to provide a data-transmitting method for a wireless sensor network clustering a plurality of nodes of a wireless sensor network to form several groups and identifies several dissemination nodes within different tiers to effectively transmit data. Consequently, required power for the wireless sensor network is low.

The secondary objective of this invention is to provide the data-transmitting method for a wireless sensor network able to automatically insert other tiers with other dissemination nodes when any one of the original dissemination nodes is over-loaded. As a result, the loading of the over-loaded dissemination node is effectively lowered The data-transmitting method for a wireless sensor network in accordance with an aspect of the present invention includes the steps of: constructing a wireless sensor network having a plurality of nodes and a sink, with the nodes able to sense environmental information and transmit data to each other and with the sink able to raise quests to and collect the sensed environmental information from the nodes; clustering the nodes to form a plurality of groups, with one of the nodes in each group identified as a kernel and the nodes in the same group around the kernel being most clustered; identifying one of all the nodes as a summit dissemination node and the kernels in all the groups as first level dissemination nodes, with the summit dissemination node being a nearest node to a geometric center of all the kernels; and transmitting data between the quest-raising sink and one of the first level dissemination nodes or between said quest-raising sink and the summit dissemination node through one of the first level dissemination nodes to collect information sensed by a source that is one of the nodes.

BRIEF DESCRIPTION OF THE DRAWINGS

The present invention will become more filly understood from the detailed description given hereinbelow and the accompanying drawings which are given by way of illustration only, and thus are not limitative of the present invention, and wherein.

DETAILED DESCRIPTION OF THE INVENTION

Figure 1:
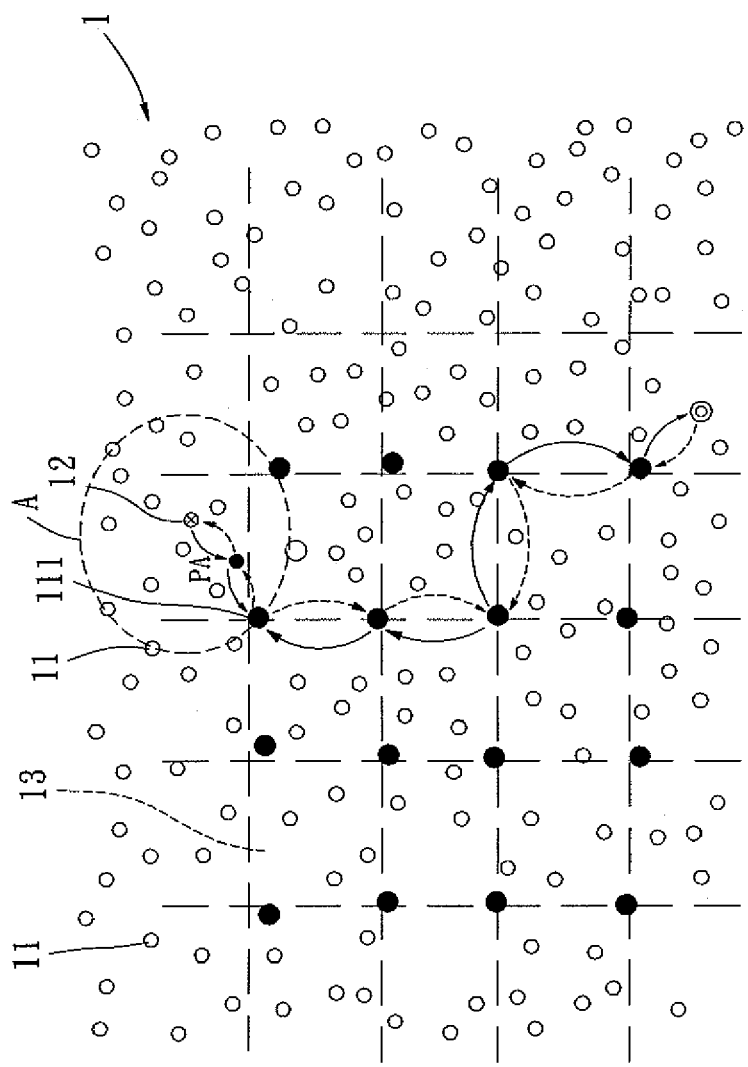
FIG. 1 is a schematic map of a conventional TTDD data-transmitting method for a wireless sensor network.
Figure 2:
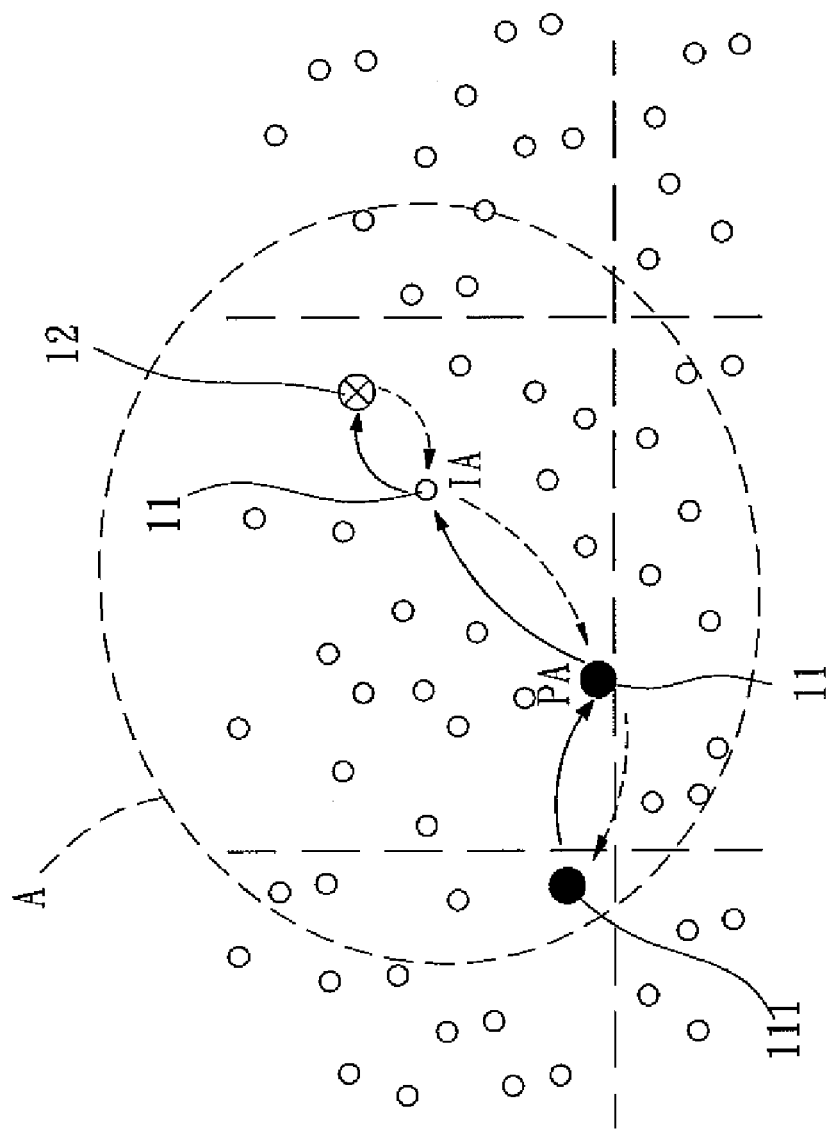
FIG. 2 is a schematic map illustrating a virtual cube A of said TTDD data-transmitting method for the wireless sensor network of FIG. 1.
Figure 3:
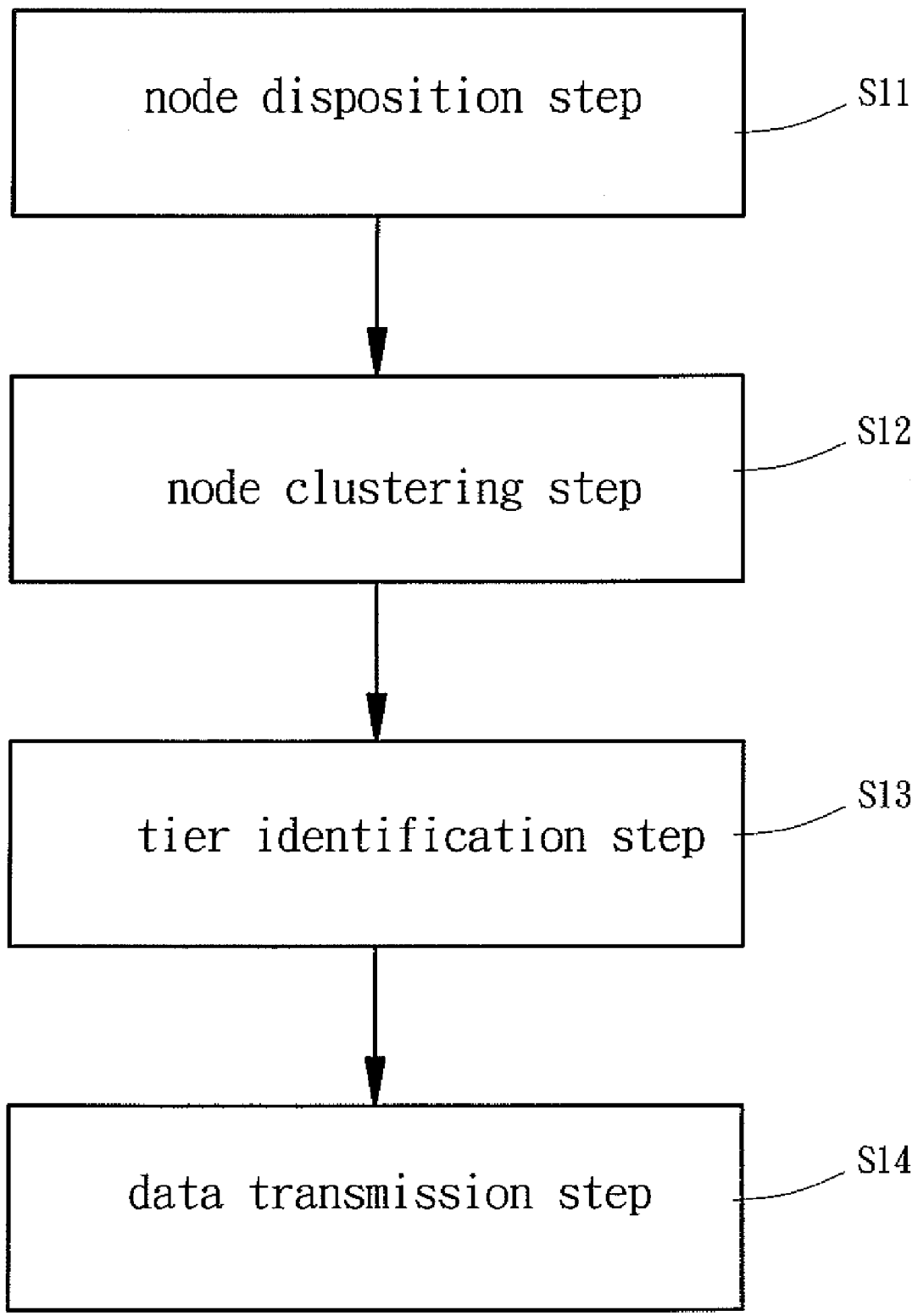
FIG. 3 is a flow chart illustrating a data-transmitting method for a wireless sensor network in accordance with a first embodiment of the present invention.

Referring to FIG. 3, in accordance with a first embodiment of the present invention, the data-transmitting method for a wireless sensor network comprises a "node disposition step" designated as "S11", a "node clustering step" designated as "S12", a "tier identification step" designated as "S13", and a "data transmission step" designated as "S14". The steps S11 through S14 are respectively and sequentially utilized to construct a wireless sensor network, to produce several groups of nodes of the wireless sensor network by clustering said nodes, to identify plural dissemination nodes as various tiers of the wireless sensor network, and to transmit data with each of the dissemination nodes being a pivot of the nodes in the same group.

Figure 4:
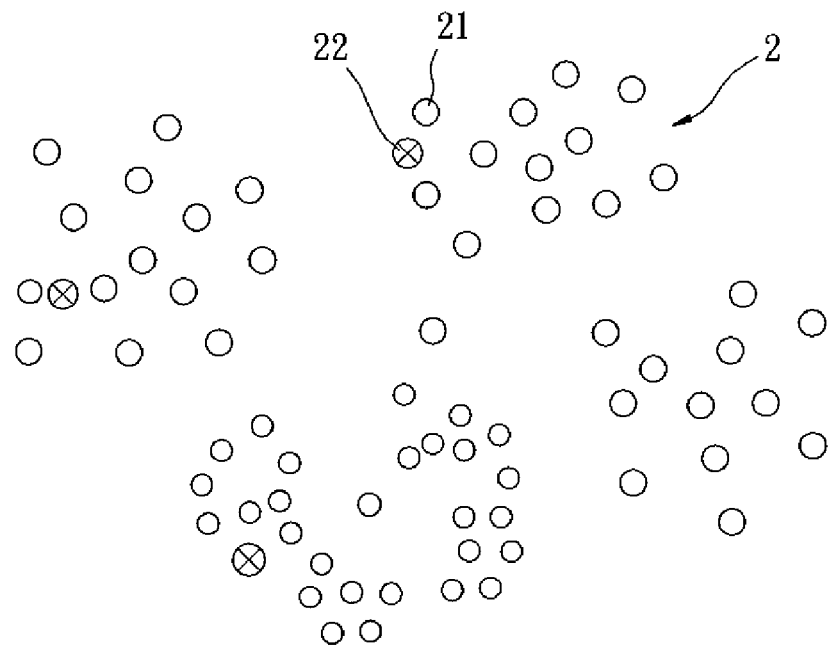
FIG. 4 is a schematic map of said data-transmitting method in accordance with the first embodiment of the present invention when a "node disposition step" is done.

Turning now to FIGS. 3 and 4, a wireless sensor network 2 is constructed through the step S11, such that a control unit (not illustrated) may plan transmitting schedules for data transmission within the wireless sensor network 2. The wireless sensor network 2 comprises a plurality of nodes 21 and at least one sink 22, with each of the nodes 21 being applied to sense environmental information such as temperature, humidity, illumination, or sound and being able to transmit data to other nodes 21 within a sensing radius thereof. Besides, the at least one sink 22 is a data receiver that raises quests for data collection and receives data provided by the nodes 21, to be an interface between the wireless sensor network 2 and a user or an external system.

Figure 5:
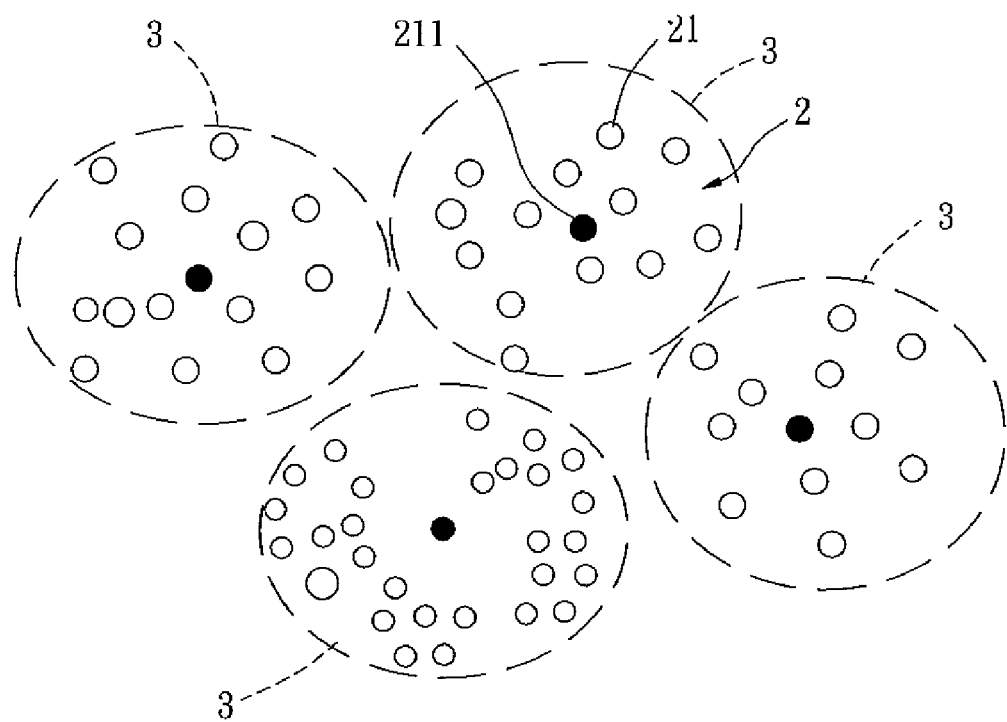
FIG. 5 is a schematic map of said data-transmitting method in accordance with the first embodiment of the present invention when a "node clustering step" is done.
Figure 6:
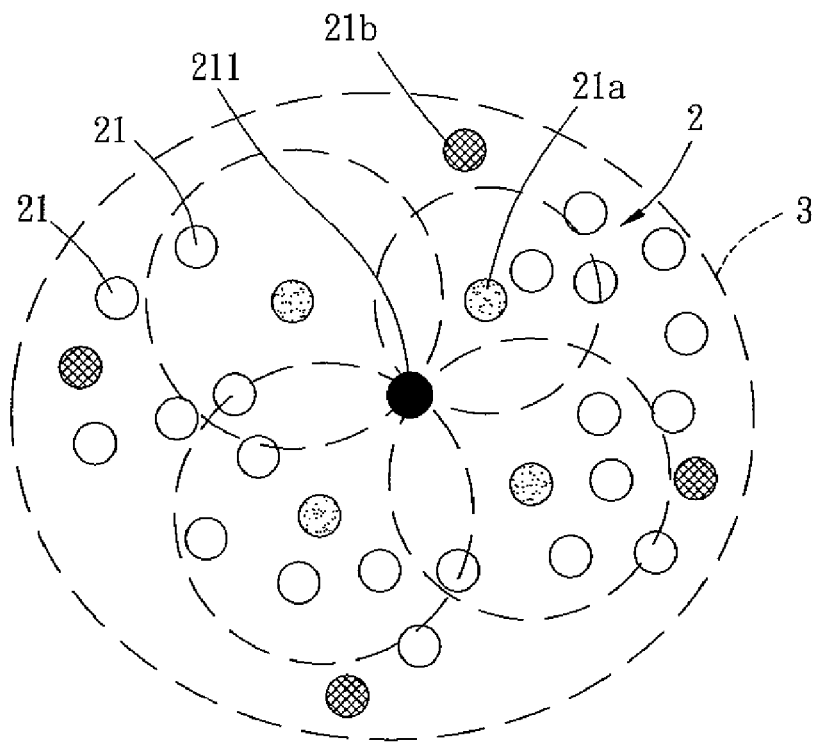
FIG. 6 is a schematic map of a group of said data-transmitting method in accordance with the first embodiment of the present invention when the "node clustering step" is done.

Turning now to FIGS. 3, 5 and 6, through the step S12, the nodes 21 of the wireless sensor network 2 are disposed in an two-dimensional space, and the nodes 21 are roughly clustered to form a plurality of groups 3 fast by a distance-measuring-based K-means algorithm or the like. After that, a detailed clustering process is then executed according to the following. In the beginning, in each group 3, one of the nodes 21 around which the nodes 21 are most clustered is identified as a kernel 211. Then, a plurality of the nodes 21 in the same group 3 in various radial directions from the kernel 211 are selected, with those selected nodes 21 in each direction being an adjacent node 21a and a remote node 21b. In each direction, the adjacent node 21a is the nearest node 21 to the kernel 211, and the remote node 21b is the farthest one. Finally, for each group 3, circles with the adjacent nodes 21a as centers and the distances between the kernel 211 and the adjacent nodes 21a as radiuses are obtained, and the nodes 21 in the circles are identified as in the same and original group 3. In contrast to those being within the circles, the nodes 21 that are out of the circles are then re-clustered to be in the original group 3 or another of the groups 3. In detail, distances between all the remote nodes 21b and the nodes 21 out of the circles are calculated to re-cluster each said node 21 to be in the same group 3 containing one of the remote nodes 21b that is the nearest remote node 21b to the re-clustered node 21. Through the above-mentioned detailed clustering process, the groups 3 are thus refined.

For instance, as shown in FIG. 5, the plurality of nodes 21 is disposed in a two-dimensional space into a square shape, and there are four groups 3 with each of them having a single kernel 211, that is, four kernels 211 in total. Besides, one of the groups 3 is shown in FIG. 6 in detail as a sample to illustrate the clustering process, and the numbers of the adjacent nodes 21a, remote nodes 21b and circles in the same group 3 are four respectively. Furthermore, if the nodes 21 are disposed in a two-dimensional pentagonal space, it is preferable to cluster the nodes 21 to form five groups 3. The numbers of the groups 3 for other shapes of the space with the nodes 21 disposed inside may be deduced by analog.

Figure 7:
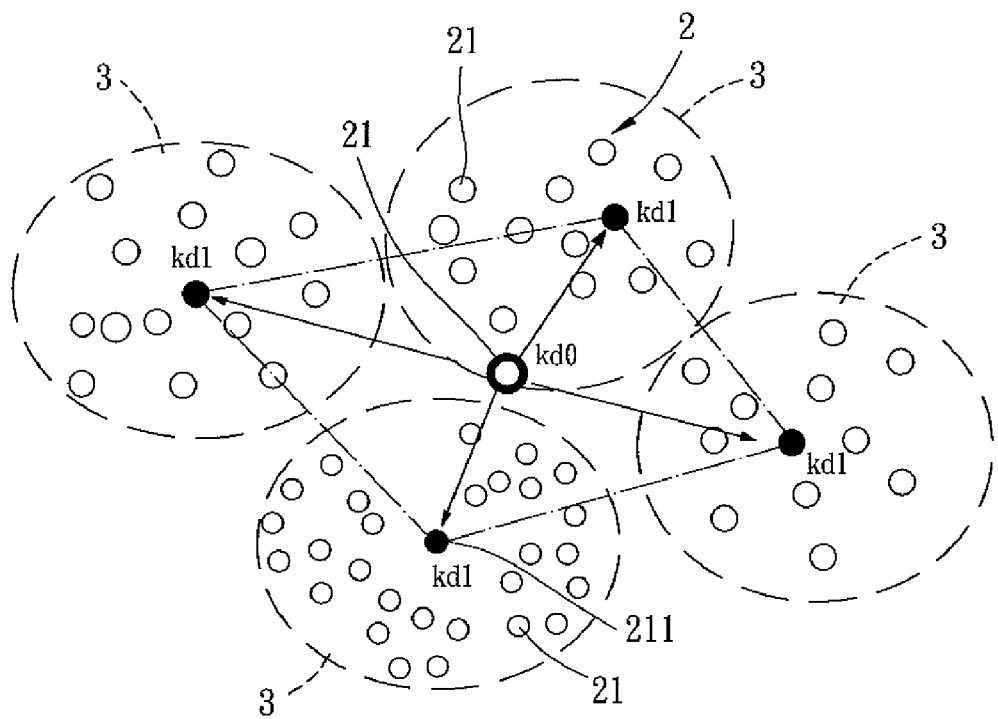
FIG. 7 is a schematic map of said data-transmitting method in accordance with the first embodiment of the present invention when a "tier identification step" is done.

Turning now to FIGS. 3 and 7, in the step S13, two tiers are established in the wireless sensor network 2. That is, one of the nodes 21 is identified as a summit dissemination node "kd0", and the kernels 211 are further identified as first level dissemination nodes "kd1". The node 21 identified as the summit dissemination node "kd0" is a nearest node 21 to a geometric center of all the kernels 211 and is applied to manage and record data passed through the first level dissemination nodes "kd1" (kernels 211) and also to store positions of the first level dissemination nodes "kd1". For example, as shown in FIG. 7, the summit dissemination node "kd0" is one of the nodes 21 that is nearest to the geometric center of the four kernels 211, while said four kernels 211 are identified as the first level dissemination nodes "kd1".

Figure 8:
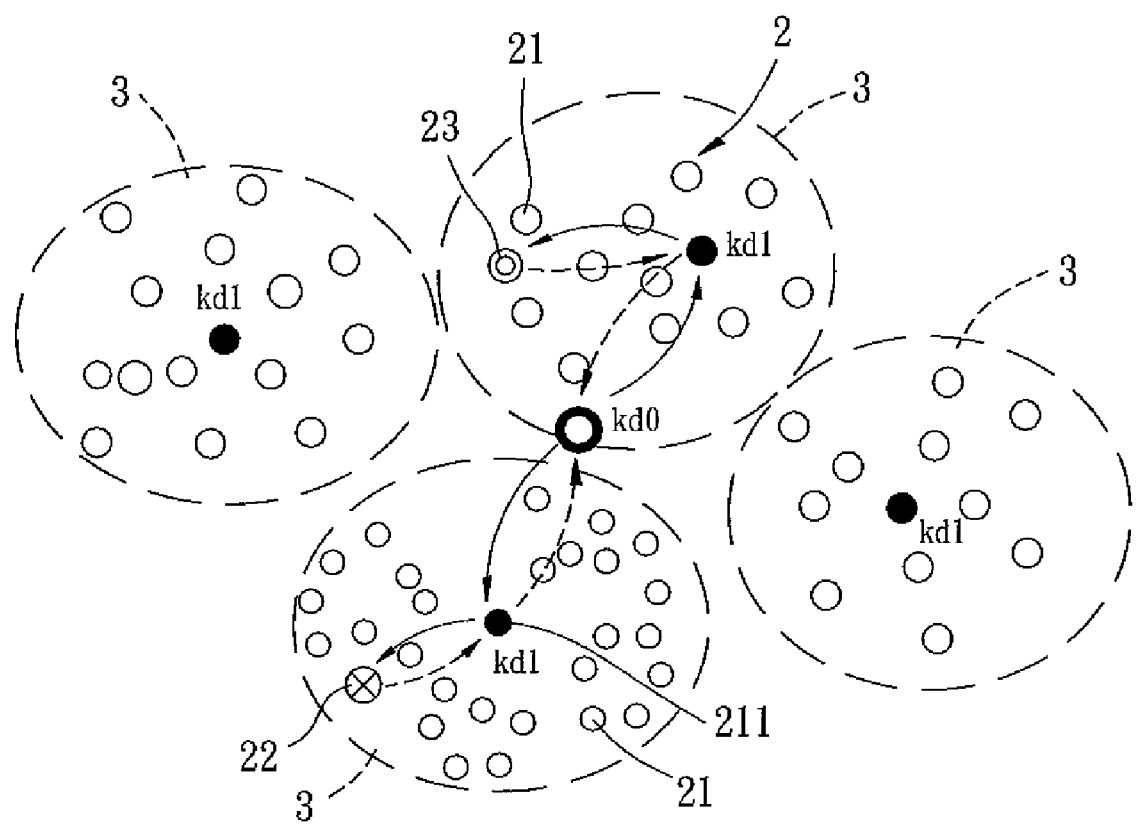
FIG. 8 is a schematic map of said data-transmitting method in accordance with the first embodiment of the present invention to illustrate a "data transmission step"

Turning now to FIGS. 3 and 8, in the step S14, a source 23 that is one of the nodes 21 transmits information of collected data and its position to a nearest first level dissemination node "kd1" initially, and then, said information is further transmitted to the summit dissemination node "kd0". Thus, after the sink 22 raises quests for data collection, the nearest first level dissemination node "kd1" to the sink 22 receives and sends the raised quests to the summit dissemination node "kd0" to search in quest of information about the source 23. Furthermore, when both the sink 22 and the source 23 are adjacent to the same first level dissemination node "kd1", the sink 22 can directly obtain information about the source 23 from the first level dissemination node "kd1". Therefore, raising a quest to the summit dissemination node "kd0" for information about the source 23 is thus needless, such that a better effect on data transmission is achieved.

In addition, for the first level dissemination nodes "kd1", it is preferable to provide "group IDs" along with the transmitted information, with every "group ID" representing every position of the first level dissemination nodes "kd1" being unique. When the sink 22 raises a quest to one of the first level dissemination nodes "kd1", the "group ID" of the first level dissemination node "kd1" from which the sink 22 acquired last information of the source 23 is sent along with the present raised quest. The first level dissemination node "kd1" receiving the present quest can thus compare its "group ID" with the "group ID" sent by said sink 22. If these two "group IDs" are the same, it means that said sink 22 is still in the area of the same group 3, and the route for data transmission does not have to be changed. However, if said two "group IDs" are different, said sink 22 must have been moved from the original group 3 to another, and, thus, the route for data transmission has to be changed.

Through the constructed wireless sensor network 2 and the "data transmission step" S14, the control unit of the present invention can effectively handle the data transmission between or within all the groups 3 through the summit and first level dissemination nodes "kd0", "kd1". Thereby, serious flooding can be avoided, and required power for the wireless sensor network 2 is low.

Figure 9:
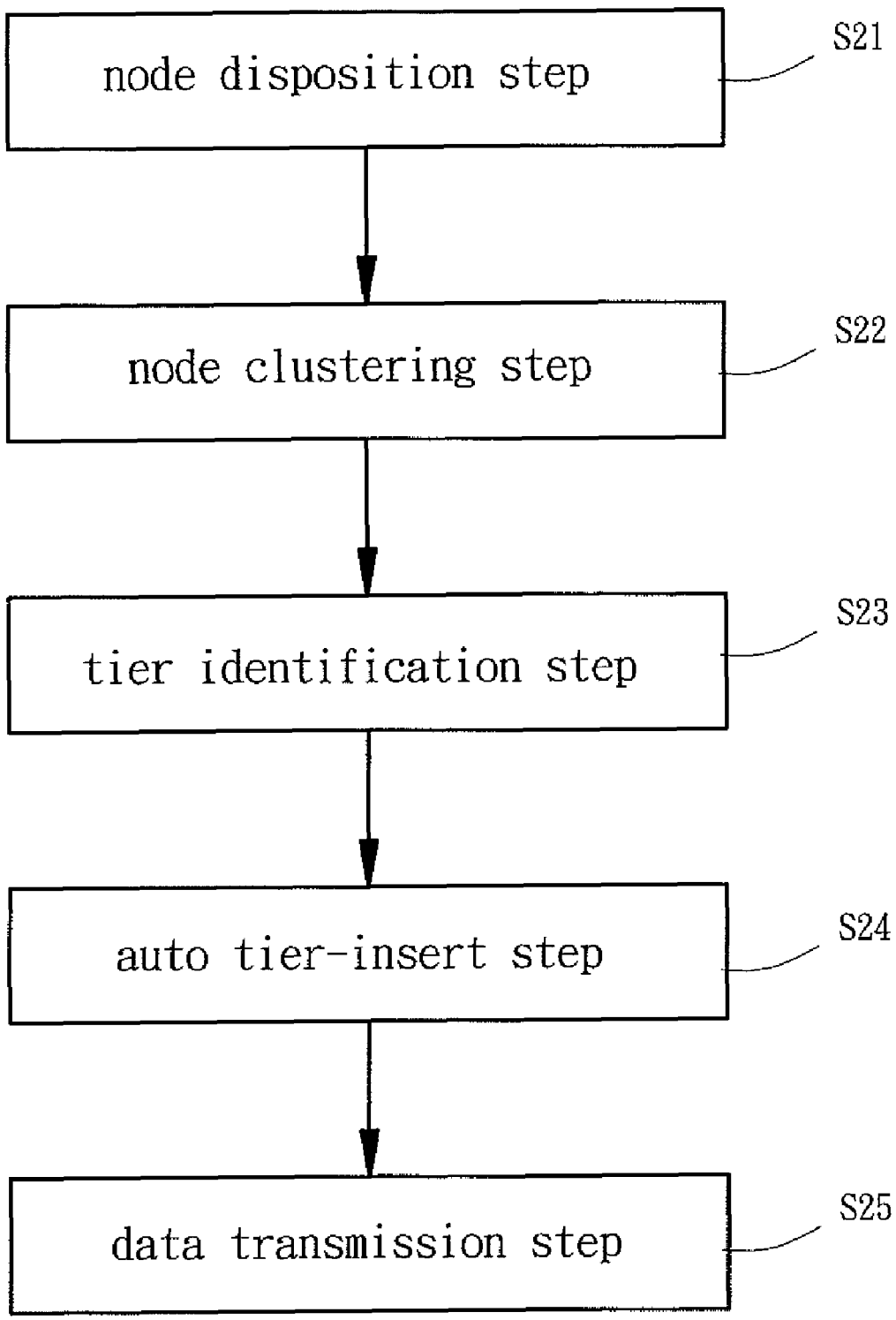
FIG. 9 is a flow chart illustrating a data-transmitting method for data dissemination model in a wireless sensor network in accordance with a second embodiment of the present invention.

Now turning to FIG. 9, a flow chart in accordance with a second embodiment of the present invention is illustrated. The second embodiment comprises a "node disposition step" designated as "S21", a "node clustering step" designated as "S22", a "tier identification step" designated as "S23", an "auto tier-insert step" designated as "S24" and a "data transmission step" designated as "S25". The steps S21 through S23 operate in the same way as the steps S11 through S13 of the first embodiment do. Besides, the step S24 is applied to automatically insert new tiers having some nodes 21 with low utilization rates to lower the loading of nodes 21 with high utility rates when an over-load occurs. The detailed operations of the steps S24, S25 are shown in the following.

Figure 10:
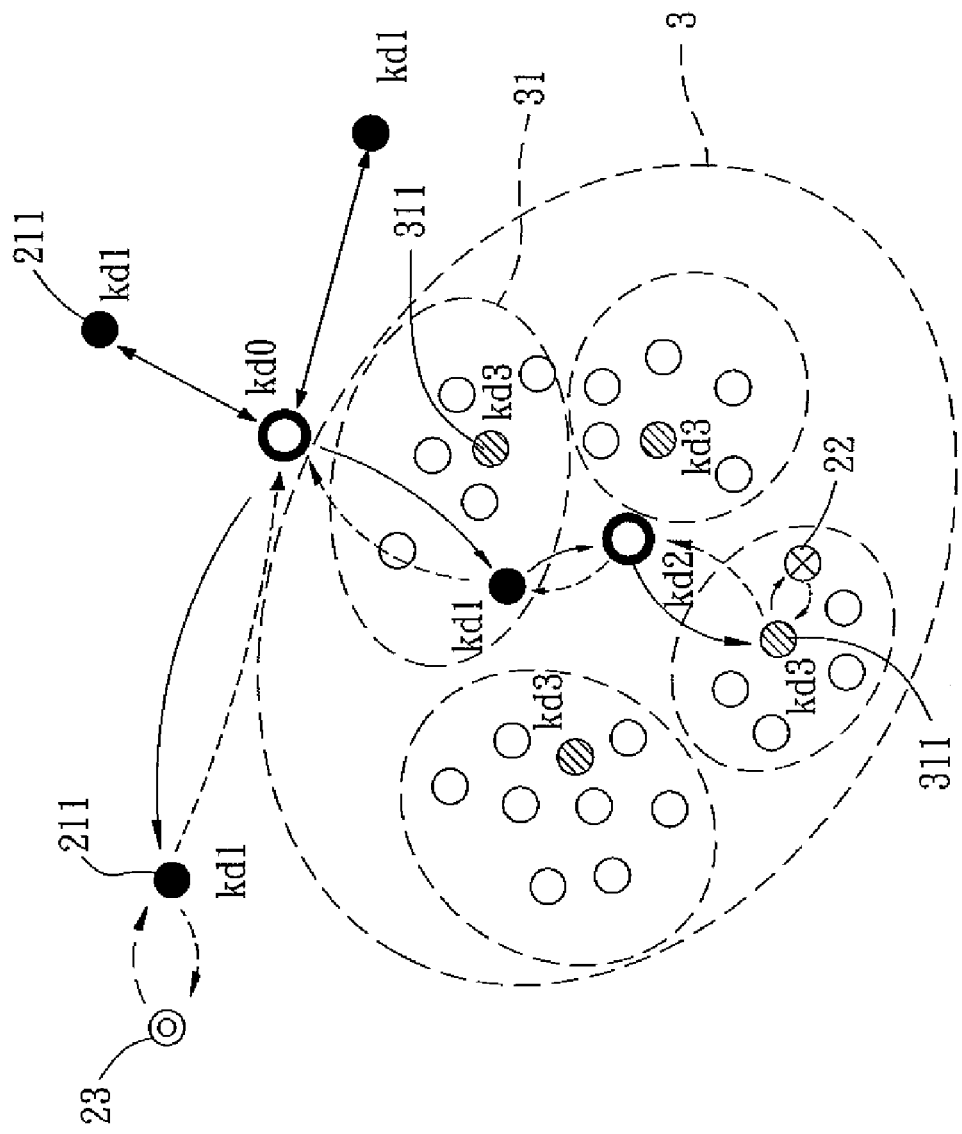
FIG. 10 is a schematic map of said data-transmitting method in accordance with the second embodiment of the present invention when an "auto tier-insert step" is done.

The step S24 takes place when the amount of information simultaneously passing through one of the first level dissemination nodes "kd1" is larger than a limit value. That is, the node 21 identified as said first level dissemination nodes "kd1" is over-loaded. In step S24 as shown in FIG. 10, when any one of the first level dissemination nodes "kd1" is over-loaded, the nodes 21 in the group 3 that contains the over-loaded first level dissemination nodes "kd1" are further clustered. By the same manner illustrated in the operation of S12, a plurality of sub-groups 31 with each sub-group 31 providing a sub-kernel 311, is obtained in said group 3. Furthermore, by the same manner illustrated in the operation of S13, a nearest node 21 to a geometric center of all the sub-kernels 311 is identified as a second level dissemination node "kd2", and the sub-kernels 311 are identified as third level dissemination nodes "kd3", so that two new tiers are established thereby. Said step S24 can be operated repeatedly to establish more than only two tiers. Besides, after step S24 is executed, dissemination nodes of the last level, such as the third level dissemination nodes "kd3" shown in FIG. 10, are also identified as basic dissemination nodes.

Please refer now to FIGS. 3 and 10, in the step S25, the source 23 transmits information of collected data and its position to the summit dissemination node "kd0" initially. Thus, when the sink 22 raises a quest for data collection, the nearest basic dissemination node to the sink 22, such as the third level dissemination nodes "kd3" shown in FIG. 10, is then utilized to transmit the raised quest to the summit dissemination node "kd0" in quest of information about the source 23 through all the tiers. Namely, in FIG. 10, the quest raised by the sink 22 is then transmitted through the second and first level dissemination nodes "kd2", "kd1" in sequence. Consequently, the loading of the over-loaded first level dissemination nodes "kd1" is effectively lowered.

Figure 11:
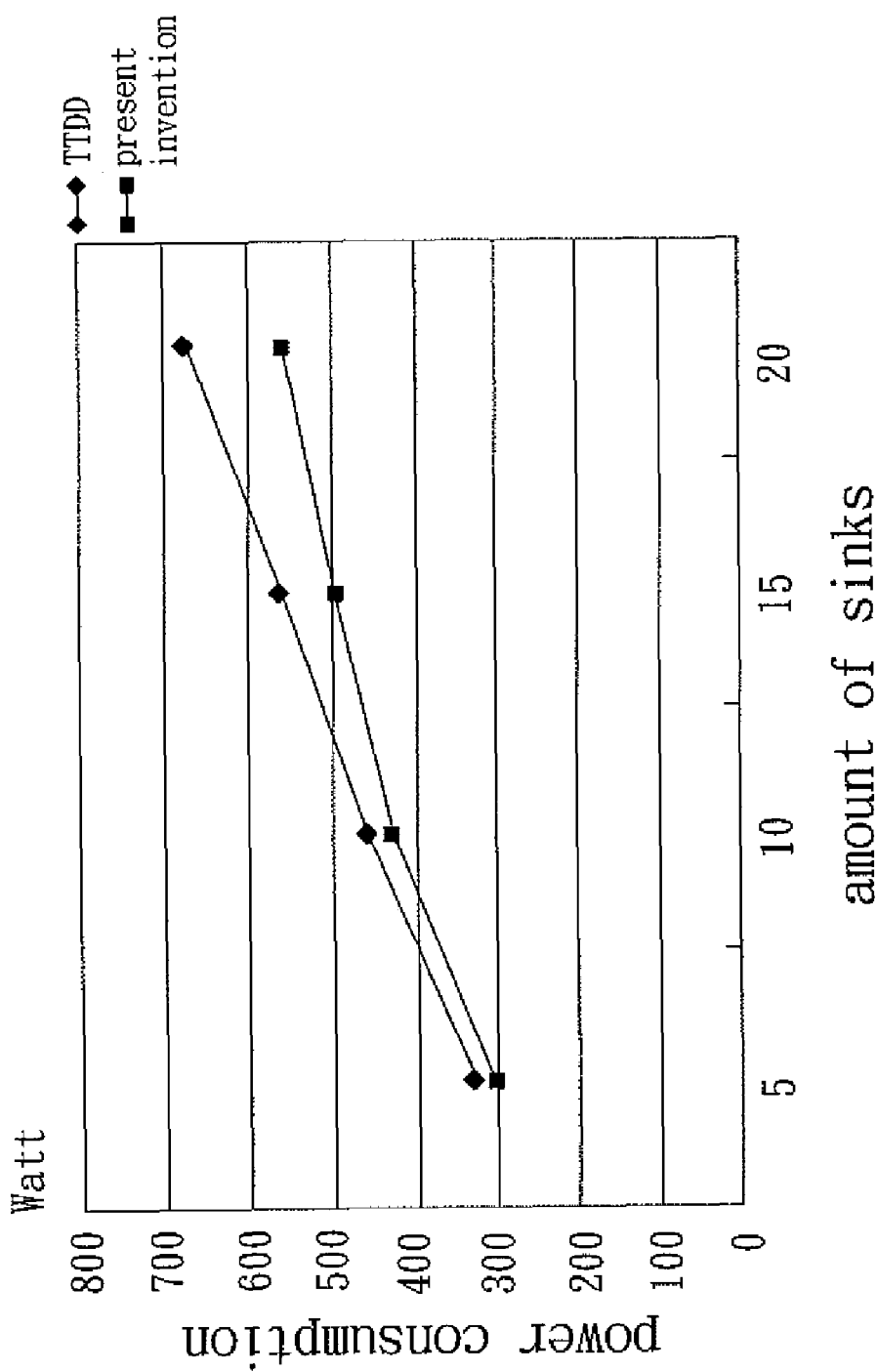
FIG. 11 is a comparison sheet of amounts of power consumption over the present invented data-transmitting method and the TTDD data-transmitting method with a single source.
Figure 12:
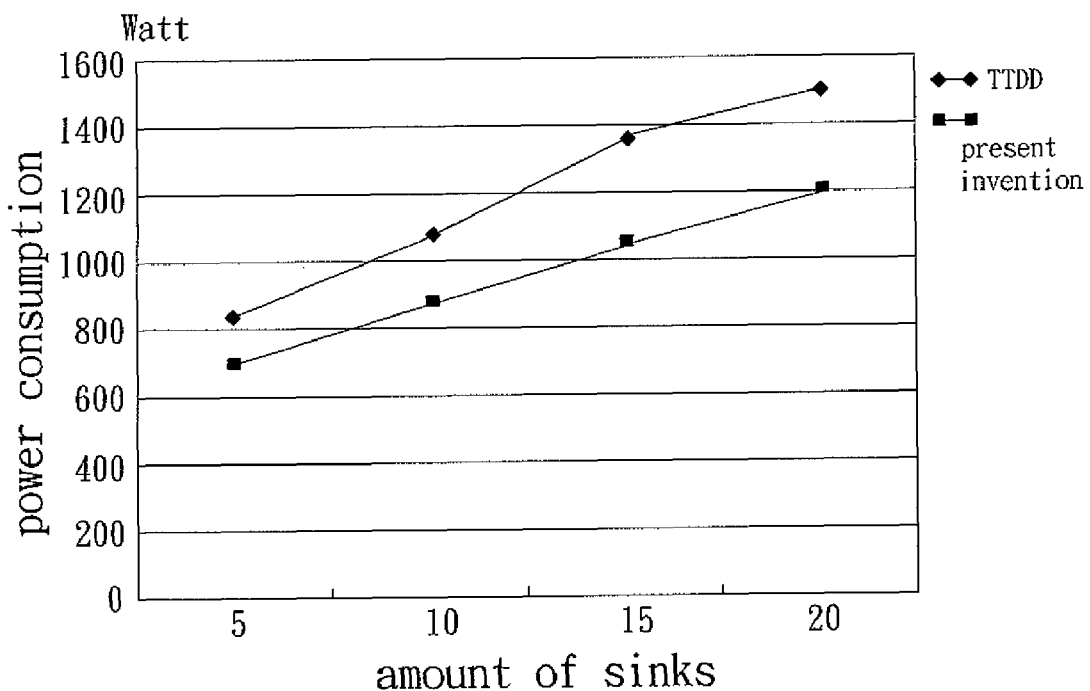
FIG. 12 is a comparison sheet of amounts of power consumption over the present invented data-transmitting method and the TTDD data-transmitting method with four sources.
Figure 13:
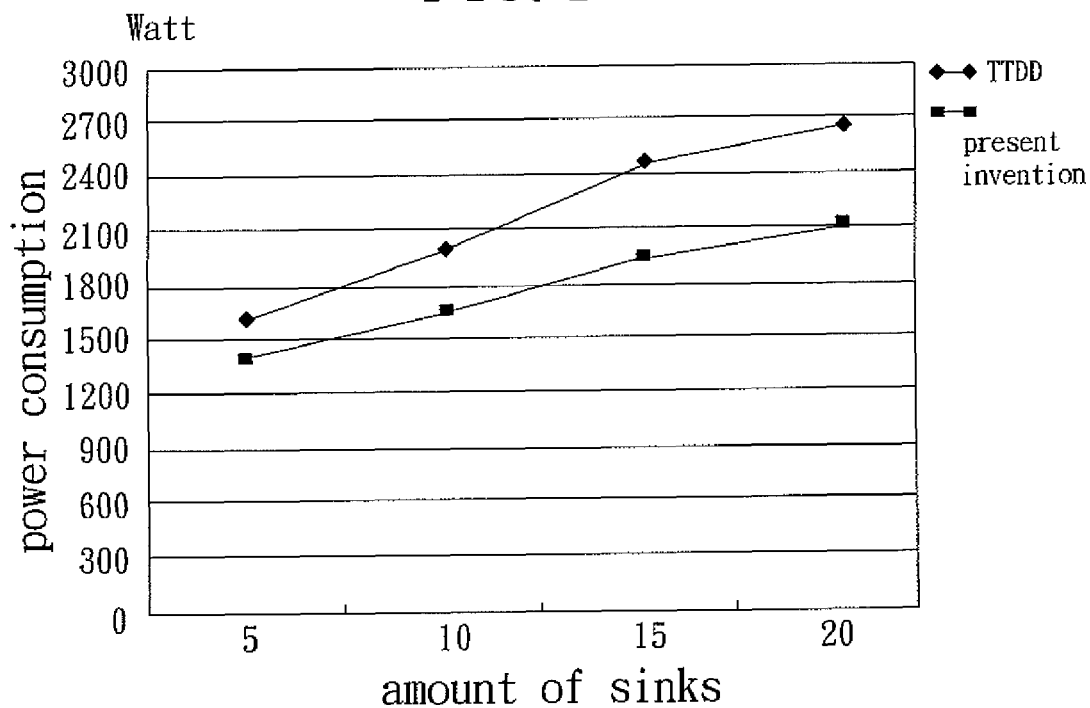
FIG. 13 is a comparison sheet of amounts of power consumption over the present invented data-transmitting method and the TTDD data-transmitting method with eight sources.

There are three sets of experiment statistics shown as the following illustrating comparisons between the present invention and the conventional TTDD data-transmitting method, with table I, table II and table III respectively corresponding to FIGS. 11, 12 and 13.

TABLE I single source

| | power consumption (unit: watt) | |
|---|---|---|
| amount of sinks | TTDD method | present invention |
| 5 | 325 | 300 |
| 10 | 457 | 420 |
| 15 | 557 | 487 |
| 20 | 668 | 550 |

TABLE II four sources

| | power consumption (unit: watt) | |
|---|---|---|
| amount of sinks | TTDD method | present invention |
| 5 | 850 | 710 |
| 10 | 1085 | 885 |
| 15 | 1364 | 1051 |
| 20 | 1505 | 1198 |

TABLE III eight sources

| | power consumption (unit: watt) | |
|---|---|---|
| amount of sinks | TTDD method | present invention |
| 5 | 1615 | 1398 |
| 10 | 1995 | 1650 |
| 15 | 2455 | 1940 |
| 20 | 2680 | 2120 |

In contrast to the conventional power-wasting method, the present invention provides the wireless sensor network 2 containing the nodes 21 clustered to form the refined groups 3 and several tiers through a Hierarchical data clustering technique. The wireless sensor network 2 can effectively transmit data between the nodes 21 with a low loading over the nodes 21 and low power consumption for operation of the wireless sensor network 2.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. A data-transmitting method for a wireless sensor network comprising:
   constructing a wireless sensor network having a plurality of nodes and a sink, with the nodes sensing environmental information and transmitting data to each other and the sink raising quests to and collecting the sensed environmental information from the nodes;
   clustering the plurality of nodes to form a plurality of groups, with one of the plurality of nodes in each group identified as a kernel and the nodes in the same group around the kernel being most clustered;
   identifying one of all the plurality of nodes as a summit dissemination node and the kernels in all the plurality of groups as first level dissemination nodes, with the summit dissemination node being a nearest node to a geometric center of all the kernels;

transmitting data between the quest-raising sink and one of the first level dissemination nodes or between said sink and the summit dissemination node through one of the first level dissemination nodes to collect information sensed by a source that is one of the plurality of nodes; and executing when the nodes are clustered;

clustering the plurality of nodes to form said plurality of groups by a K-means algorithm;

locating the kernel of each group;

selecting a plurality of the nodes in various radial directions from the kernel for each group, wherein those selected plurality of nodes is an adjacent node and a remote node in each direction, with the adjacent node being a nearest node to the kernel and the remote node being a farthest node to the kernel;

obtaining a plurality of circles for each group, with the adjacent nodes as centers and distances between the kernel and the adjacent nodes as radiuses; and identifying the nodes in the circles in an original group while the nodes out of the circles being re-clustered to be in the original group or another of the groups.

2. The data-transmitting method for the wireless sensor network as defined in claim 1, wherein the transmitted data includes the sensed environmental information and a position of the source.

3. The data-transmitting method for the wireless sensor network as defined in claim 1, wherein distances between all the remote nodes and the nodes out of the circles are calculated for re-clustering each said node to be in the same group containing one of the remote nodes that is a nearest remote node to the re-clustered node.

4. The data-transmitting method for the wireless sensor network as defined in claim 1, wherein the transmitted data includes a group ID representing the first level dissemination node of each group, with different first level dissemination nodes of groups providing different group IDs.

5. The data-transmitting method for the wireless sensor network as defined in claim 4, wherein, in data transmitting, the group ID of the first level dissemination node from which the sink acquired last information of the source is sent along with the raised quest from the sink to one of the first level dissemination nodes receiving said quest to compare the group ID of the first level dissemination node with the group ID sent out from the sink, with a route for data transmission being kept the same if said two group IDs are the same and being changed if said two group IDs are different.

6. The data-transmitting method for the wireless sensor network as defined in claim 1, wherein, when other plural sinks are utilized and one of the first level dissemination nodes is over-loaded, tiers having another of the nodes with low utilization rates are inserted automatically to lower loading of said over-loaded first level dissemination node and a plurality of basic dissemination nodes are identified, with the data being transmitted between the quest-raising sink and the summit dissemination node through the basic dissemination nodes.

7. The data-transmitting method for the wireless sensor network as defined in claim 6, wherein the nodes in one of the groups containing the over-loaded first level dissemination node are further clustered in a same way by which all the nodes are clustered to form the groups.

* * * * *